Patented Apr. 1, 1947

2,418,297

UNITED STATES PATENT OFFICE 2,418,297

SUBSTITUTED DIOXANES

Frederic A. French and Lynwood N. Whitehill, Berkeley, Calif., assignors to Shell Development Company, San Francisco, Calif., a corporation of Delaware No Drawing. Application January 4, 1944, Serial No. 516,980

8 Claims. (Cl. 260—338)

This invention relates to new and useful substituted dioxanes of the formula

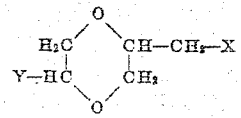

wherein X is a member of the group consisting of the halogen atoms and the —OR group, and Y is a member of the group consisting of the hydrogen atom, the —CH₂OH group, a —CH₂OR group and a —CH₂Hal group, R representing a hydrocarbon radical such as the alkyl, alkenyl, aryl, alkaryl, alkenaryl, aralkyl, aralkenyl, and alicyclic radicals, e. g., methyl, ethyl, propyl, isopropyl, n-butyl, isobutyl, pentyl, vinyl, allyl, methallyl, butenyl, pentenyl, benzyl, phenyl, p-xylyl, cinnamyl, cyclopentyl, cyclopentenyl, cyclohexyl, cyclohexenyl, isophoryl, hexadienyl, and the like and their homologues, and Hal representing a halogen atom. The halogen atom represented by the above radicals is preferably selected from the group consisting of chlorine, bromine and iodine.

An object of the invention is to provide new substituted dioxanes of the above formula which have value as solvents, diluents, modifying agents, plasticizers, in insecticides, processing reagents in the textile industry, intermediates in organic syntheses, etc. These dioxanes are particularly suitable as solvents; for example, as solvents for cellulose esters which are used in the silk and varnish industries. The halogen substituted dioxanes are especially useful as solvents. Novel dioxanes of the proper boiling point range are of value for use as solvents for lacquers and as plasticizers, for example, for cellulose ethers and esters. The novel alloxy substituted dioxanes may be readily polymerized to form tough resistant films. These dioxanes also readily form addition compounds so that they are useful as intermediates in the preparation of numerous compounds which are difficult or as yet impossible to prepare by other methods. A further object of the invention is to provide methods for the preparation of the dioxanes of the class herein disclosed.

The substituted dioxanes of the above general formula may be prepared by reacting in a hot alkali solution a compound of the formula

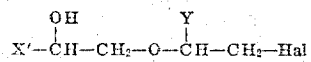

wherein X' is a member of the group consisting of the hydrogen atom and a —CH₂OR group, Y is a member of the group consisting of the hydrogen atom, the —CH₂OH group, a —CH₂OR group and a —CH₂Hal group, except that when X' is hydrogen, Y cannot be hydrogen or CH₂OH, R representing a hydrocarbon radical such as the alkyl, alkenyl, aryl, alkaryl, alkenaryl, aralkyl, aralkenyl, and alicyclic radicals, e. g., methyl, ethyl, propyl, isopropyl, n-butyl, isobutyl, pentyl, vinyl, allyl, methallyl, butenyl, pentenyl, benzyl, phenyl, p-xylyl, cinnamyl, cyclopentyl, cyclopentenyl, cyclohexyl, cyclohexenyl, isophoryl, hexadienyl, and the like, and their homologues, and Hal representing a halogen atom. The halogen atom represented by the above radicals is preferably chlorine, bromine or iodine. Examples of suitable starting materials include the disubstituted monohalohydrin ethers of alpha beta' diglycerol corresponding to the formula

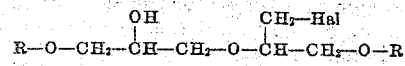

such as alpha beta'-diglycerol gamma gamma'-dimethyl alpha'-monochlorohydrin ether, alpha beta'-diglycerol gamma gamma'-diethyl alpha'-monochlorohydrin ether, alpha beta'-diglycerol gamma gamma'-dipropyl alpha'-monobromohydrin ether, alpha beta'-diglycerol gamma-methyl gamma'-isopropyl alpha'-monobromohydrin ether, alpha beta'-diglycerol gamma gamma'-divinyl alpha'-monochlorohydrin ether, alpha beta'-diglycerol gamma gamma'-diallyl alpha'-monochlorohydrin ether, alpha beta'-diglycerol gamma gamma'-diphenyl alpha'-monochlorohydrin ether and the like and their homologues which will produce 2,5-di-substituted-1,4-dioxanes; the glycerol alpha-substituted gamma-(beta-haloethyl) ethers corresponding to the formula

such as glycerol alpha-methyl gamma-(beta-chloroethyl) ether, glycerol alpha-ethyl gamma-(beta-chloroethyl) ether, glycerol alpha-vinyl gamma-(beta-chloroethyl) ether, glycerol alpha-allyl gamma-(beta-bromoethyl) ether, glycerol alpha-methallyl gamma-(beta-chloroethyl) ether, glycerol alpha-benzyl gamma-(beta-iodoethyl) ether, and the like and their homologues which produce 2-substituted-1,4-dioxanes; and the dihalohydrin ethers corresponding to the formula

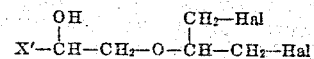

wherein X' is a hydrogen atom or —CH₂OR, R representing a hydrocarbon radical, and Hal represents a halogen atom, such as glycerol alpha gamma-dichlorohydrin beta-hydroxyethyl ether (when X' is the hydrogen atom), alpha beta'-diglycerol gamma-methyl alpha' gamma'-dichlorohydrin ether (when X′ is —CH₂—O—CH₃), alpha beta′-diglycerol gamma-allyl alpha′ gamma′-dichlorohydrin ether (when X′ is —CH₂—O—C₃H₅), and the like and their homologues which will produce 2-halomethyl-1,4-dioxanes and 2-substituted 5-halomethyl-1,4-dioxanes.

These starting materials may be prepared by any suitable means such as by reacting an epoxy compound with a mono- or di-halohydrin. For example: alpha beta′-diglycerol gamma gamma′-diallyl alpha′-monochlorohydrin ether may be prepared by reacting glycerol alpha-monochlorohydrin gamma-allyl ether with glycidyl allyl ether in the presence of stannic chloride; glycerol alpha-ethyl gamma-(beta-chloroethyl) ether may be prepared by reacting glycidyl ethyl ether with ethylene chlorohydrin in the presence of stannic chloride; a dihalohydrin ether may be prepared by reacting an epihalohydrin with a halohydrin.

The hot alkali solution in which the starting material is reacted should be kept at a temperature above about 50° C. and preferably above about 60° C., but below that temperature which may be detrimental in any way to the reactants and/or products. The optimum temperature to be maintained in any case will depend upon the specific reactants chosen; for example, when 2,5-di(alloxymethyl)-1,4-dioxane is produced by the reaction of diglycerol diallyl monochlorhydrin ether in an aqueous solution of sodium hydroxide, it has been found that for superior results the temperature should be above about 70° C.

Any caustic alkali solution of sufficient strength may be chosen. Sodium hydroxide and potassium hydroxide have been found to produce satisfactory results; other suitable alkalis include calcium hydroxide, magnesium hydroxide, the carbonates, e. g., potassium carbonate and sodium carbonate, etc. The exact concentration most suitable for a specific case would of a necessity depend upon the specific organic reactant chosen and, to some extent, upon the solvent chosen and the solubility of the alkali therein. In the case of the formation of 2-(ethoxymethyl)-1,4-dioxane from glycerol alpha-ethyl gamma-(beta-chloroethyl) ether, a solution of potassium hydroxide in isopropyl alcohol of about 2N strength was sufficient; while an aqueous solution of sodium hydroxide of a strength above about 7N was necessary for the production of 2,5-di(alloxymethyl)-1,4-dioxane from diglycerol diallyl monochlorohydrin ether.

The solvent which may be used for the alkali should be substantially inert to the reactants and products under the conditions of the reaction, and may be water or any of the lower alcohols below about C₅, e. g., ethanol, isopropyl alcohol, n-propanol, butanol, etc.

Any suitable type container heated by any convenient means may be used, and the reaction takes place preferably at about atmospheric pressure, although in some cases superatmospheric pressures may be deemed desirable.

Other suitable processes may be employed in the production of the new dioxanes of this invention. For example, the corresponding dihydroxy compounds, $$X-CH_2-\overset{OH}{\underset{|}{C}H}-CH_2-O-\overset{Y}{\underset{|}{C}H}-CH_2OH$$

may be reacted under proper dehydration conditions in the presence of a suitable dehydration catalyst to produce these new dioxanes; or some of the dioxanes may be prepared by the dimerization of the corresponding epoxy ethers,

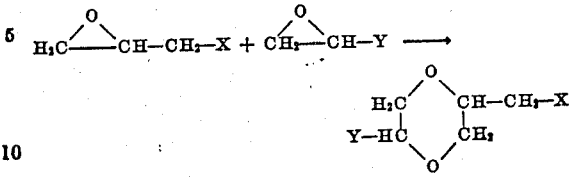

for example:

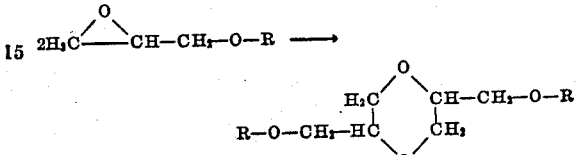

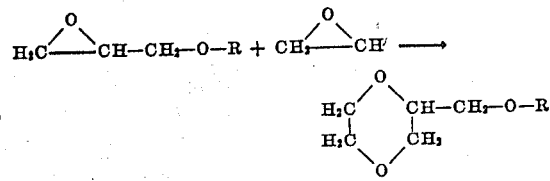

This dimerization may take place in the presence of a suitable catalyst, for example, acid catalysts or a boron fluoride etherate.

The halogen-substituted dioxanes may be hydrolyzed under appropriate conditions to form the corresponding hydroxy-substituted dioxanes; for example, 2-ethoxymethyl 5-chloromethyl-1,4-dioxane may be hydrolyzed to obtain 2-ethoxymethyl 5-hydroxymethyl-1,4-dioxane, and 2,5-di(hydroxymethyl)-1,4-dioxane may be prepared by hydrolysis of 2-chloromethyl 5-hydroxymethyl-1,4-dioxane, etc.

2,5-di(hydroxymethyl)-1,4-dioxane may also be prepared by reacting alpha beta′-diglycerol alpha′-monochlorohydrin in a hot alkali solution.

The following examples are given to illustrate the preparation of three of these new dioxanes.

*Example I*

About 56 parts by weight of potassium hydroxide were dissolved in about 395 parts by weight of boiling isopropyl alcohol, and about 91 parts by weight of glycerol alpha-ethyl gamma-(beta-chloroethyl) ether were added to the boiling solution over approximately a one-hour period. Potassium chloride precipitated immediately. Heating was continued for about one hour and the reaction mixture was cooled, neutralized with hydrochloric acid and distilled. A yield of about 95 per cent of material based on the glycerol ether charged was obtained. The 2-ethoxymethyl-1,4-dioxane has a boiling point of 80° C. to 81.1° C. at 20 mm. pressure and has the following physical properties:

n—20/D   1.4325
D—20/4   1.0150

*Example II*

About 85 parts by weight of sodium hydroxide were heated in about 510 parts of isopropyl alcohol at about 80° C. until solution occurred. To the refluxing solution, about 200 parts of alpha beta′-diglycerol gamma gamma′-diallyl alpha′-monochlorohydrin ether were added over approximately a two-hour period. After refluxing the solution, it was then neutralized with concentrated HCl, filtered and the filtrate washed with isopropyl alcohol and distilled. About 145 parts of material boiling at 94° C. to 108° C. at 1 mm. were obtained, corresponding to a conversion of about 85% based on the diglycerol ether charged. The boiling point of the pure 2,5-dialloxymethyl-1,4-dioxane is 112° C. at 2 mm. pressure and has the following physical properties:

$n-20/D$ 1.4637
$D-20/4$ 1.0350

*Example III*

About 56 parts by weight of potassium hydroxide were dissolved in about 390 parts by weight of isopropyl alcohol at about 82° C., and about 120 parts by weight of alpha beta'-diglycerol alpha' gamma'-dichlorohydrin gamma-ethyl ether were added over about a two-hour period. The mixture was heated to about 75° C. for approximately five hours, then neutralized with concentrated HCl, filtered, and distilled. About 48 parts by weight of 2-chloromethyl 5-ethoxymethyl-1,4-dioxane product distilled at 86° C. to 98° C. at 3 mm. pressure.

Other novel substituted dioxanes which may be prepared according to the methods of the above examples, or by obvious modifications thereof with proper choice of starting material, include 2-methoxymethyl-1,4-dioxane, 2 - alloxymethyl-1,4 - dioxane, 2 - vinyloxymethyl - 1,4 - dioxane, 2 - propoxymethyl - 1,4 - dioxane, 2 - phenyl-oxymethyl - 1,4 - dioxane, 2,5 - di(ethoxymethyl) - 1,4 - dioxane, 2,5 - di(methalloxymethyl) - 1,4 - dioxane, 2,5 - (benzyloxymethyl) - 1,4 - dioxane, and the like and their homologues.

We claim as our invention:

1. A chemical compound of the formula

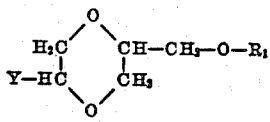

wherein $R_1$ represents an aliphatic hydrocarbon radical containing at least one olefinic linkage, and Y is a member of the group consisting of the hydrogen atom, the —CH$_2$OH group, the —CH$_2$OR group and the —CH$_2$Hal group, R representing a hydrocarbon radical and Hal representing a halogen atom.

2. A chemical compound of the formula

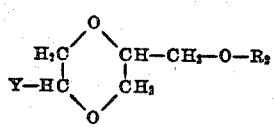

wherein $R_2$ represents a hydrocarbon radical containing an olefinic linkage between two carbon atoms of aliphatic character one of which is linked directly by a single bond to a saturated carbon atom which is directly attached to the oxygen atom, and wherein Y is a member of the group consisting of the hydrogen atom, the —CH$_2$OH group, the —CH$_2$OR group and the —CH$_2$Hal group, R representing a hydrocarbon radical and Hal representing a halogen atom.

3. A chemical compound of the formula

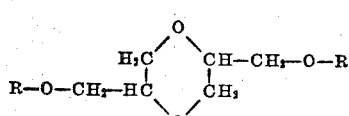

wherein R represents an aliphatic hydrocarbon radical containing at least one olefinic linkage.

4. A chemical compound of the formula

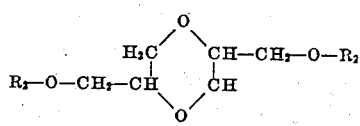

wherein $R_2$ represents an unsaturated hydrocarbon radical containing an olefinic linkage between two carbon atoms of aliphatic character one of which is linked directly by a single bond to a saturated carbon atom which is directly attached to the oxygen atom.

5. A chemical compound of the formula

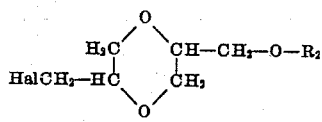

wherein Hal represents a halogen atom and $R_2$ is a hydrocarbon radical containing an olefinic linkage between two carbon atoms of aliphatic character one of which is directly linked to a saturated carbon atom which is directly attached to the oxygen atom.

6. A chemical compound of the formula

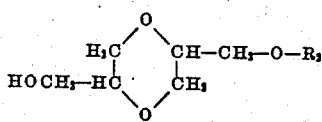

wherein $R_2$ is a hydrocarbon radical containing an olefinic linkage between two carbon atoms of aliphatic character one of which is directly linked to a saturated carbon atom which is attached directly to the oxygen atom.

7. A chemical compound of the formula

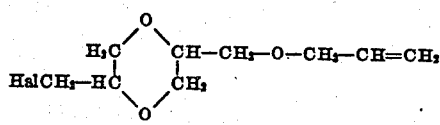

wherein Hal represents a halogen atom.

8. 2,5-di(alloxymethyl)-1,4-dioxane.

FREDERIC A. FRENCH.
LYNWOOD N. WHITEHILL.

REFERENCES CITED

The following references are of record in the file of this patent:

UNITED STATES PATENTS

| Number | Name | Date |
|---|---|---|
| 2,031,594 | Dreyfus | Feb. 25, 1936 |
| 2,062,404 | Dreyfus | Dec. 1, 1936 |
| 2,186,359 | Britton et al. | Jan. 9, 1940 |
| 2,195,386 | Britton et al. | Mar. 26, 1940 |
| 1,879,637 | Reid | Sept. 27, 1932 |

FOREIGN PATENTS

| Number | Country | Date |
|---|---|---|
| 408,230 | British | Apr. 3, 1934 |
| 396,761 | British | 1933 |

OTHER REFERENCES

Journal American Chemical Society, volume 23 (1929), page 2697.

An Outline of Organic Chemistry, 4th edition by Degering 1945, Barnes & Noble, Inc., pages 94–98.